Dec. 14, 1965     H. A. DELL     3,223,847
ANALOGUE MAGNETIC INTEGRATOR
Filed May 9, 1961     4 Sheets-Sheet 1
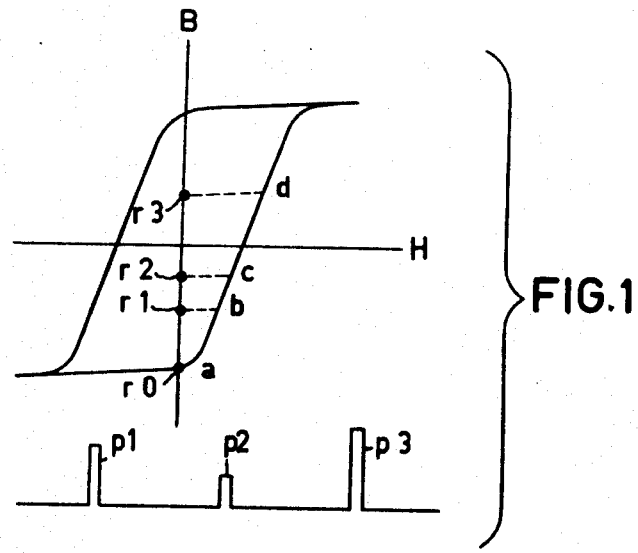
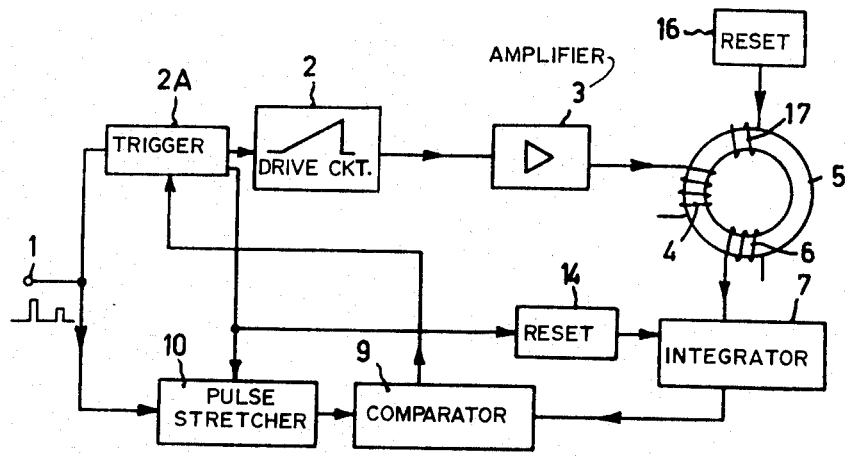
INVENTOR
HUGH A. DELL Dec. 14, 1965  H. A. DELL  3,223,847
ANALOGUE MAGNETIC INTEGRATOR
Filed May 9, 1961  4 Sheets-Sheet 2

INVENTOR
HUGH A. DELL
BY
Frank R. Trifari
AGENT

Dec. 14, 1965          H. A. DELL           3,223,847
              ANALOGUE MAGNETIC INTEGRATOR
Filed May 9, 1961                        4 Sheets-Sheet 4

INVENTOR
HUGH A. DELL
BY
AGENT

United States Patent Office 3,223,847
Patented Dec. 14, 1965

3,223,847
ANALOGUE MAGNETIC INTEGRATOR
Hugh Alexander Dell, Horley, England, assignor to North American Philips Company, Inc., New York, N.Y., a corporation of Delaware
Filed May 9, 1961, Ser. No. 108,938
Claims priority, application Great Britain, May 10, 1960, 16,502/60
11 Claims. (Cl. 307—88)

This invention relates to integrating devices and it is a primary object of the invention to provide improved magnetic integrating apparatus wherein the peak levels of any number of successive input pulses of varying amplitudes can be translated into cumulative magnetic flux levels stored in a magnetic core.

It has been proposed to count similar pulses of equal amplitude by using the storage facility offered by so-called "Square-loop" magnetic materials. Such a counter relies on the fact that, for a given flux change in a magnetic core, a certain voltage-time integral pulse is required, and on the fact that, in a square-loop material, the flux remains substantially constant when the magnetizing force is removed. In such a device, non-linearities of the hysteresis loop do not present any real problem since the magnetic element is merely required to reach saturation after a predetermined number (for example a radix of 10) of flux changes, and it is only at that stage that an output is provided. However, such a device is not suitable for fulfilling the aforementioned object of the present invention.

According to one aspect of the present invention, apparatus for the analogue summation of the peak values of successive input pulses comprises a remanent magnetic storage element, excitation means for changing the magnetization of said element, a circuit for driving said excitation means in response to the occurrence of discrete input pulses at discrete intervals of time, means for detecting and measuring any change in flux produced by said excitation means by converting the rate of such change into a voltage or current and integrating the latter so as to obtain an integrated electrical quantity representative of said change in flux, and control means for controlling the excitation with the aid of the integrated quantity in such manner as to cause each flux change to assume a value representative of the peak level of the respective input pulse.

As will be appreciated, in practice the arrangement must be such that the time constant of the integrating means is sufficiently long, relative to the duration of the change of the magnetization, for integration to be effective. On the other hand, the drive should not be applied so fast that, due to inherent limitations of the circuit, the integrated output will be delayed too much to be effective for control purposes.

If the input pulses employed have a sufficiently long rise time, the drive means may employ directly an amplified version of the pulse waveform.

If, however, the input pulse rise time is too short, a drive waveform having a sufficiently slow rise may be generated locally in the apparatus, such waveform being initiated by the occurrence of an input pulse and terminated when the flux increment reaches a level corresponding to the peak level of the respective pulse. This may be done by using apparatus wherein the drive circuit employs a triggered sawtooth circuit for generating a progressively rising drive wave of predetermined waveform when triggered by the occurrence of an input pulse, and wherein the control means comprises a comparator for comparing the output of the integrating means with a level equal or proportional to the peak level of the input pulse and producing a signal for inhibiting further rise of the drive and excitation waveforms in response to the occurrence of equality between the levels compared. In this latter arrangement it is necessary to refer, for a sufficiently long time, to the peak pulse level, and each pulse may have a flat top of sufficient duration for this process to be effected. However, in many applications the pulses will be of excessively short duration, in which case a so-called pulse "stretcher" may be used to store the peak level of the pulse for the necessary operating time.

If the peak level of the input pulse persists for a sufficiently long time but the rise time is too fast to act as a drive waveform, the pulse may be converted into a signal hraving the required slow rise and a peak level equal, or proportional, to the peak level of the pulse. The same process may be applied when a pulse of short duration has been stretched as a preliminary measure to give a derived pulse of sufficient persistence.

When each flux change has been completed, the remanent element (also referred to as the "core") will traverse part of a minor hysteresis loop as it returns to a remanent point, and it is important that the nature of the magnetic material be such that each minor loop is of relatively small area.

It is possible to use the apparatus to provide a stored flux level proportional to the peak level of a single pulse. However, the main purpose of the apparatus is to effect the summation of the peak values of a plurality of successive input pulses, and means can be provided for resetting the system (e.g. by discharging the integrating means) after the occurrence of each pulse in preparation for the next step in the summation.

When summation of all the incoming pulses on the remanent element or core is completed, the core may be reset for a further summation by exciting it in such manner as to establish a saturating magnetic flux in the opposite direction to the flux levels established as a result of the input pulses.

It is possible to add successive pulse values in a non-linear manner. For example, it may be desirable in some cases to add the input pulses logarithmically. However, it will be assumed hereinafter that a linear or arithmetical summation is required, and the examples will be described on this basis. On this assumption, it is important that the flux increment established in the core by each pulse be always substantially proportional to the peak level of the incoming pulse in spite of the non-linearity of the material of the magnetic core. One way of establishing such proportionality is to provide detecting and measuring means which utilize a second winding on the core. The voltage induced in this winding will be proportional to any change in the flux; therefore, the induced voltage can be integrated so as to provide a voltage which is proportional to the flux level induced in the core and can be used for control purposes.

In some cases, as will be explained, the integrated quantity is used to apply negative feedback to the drive means so as to maintain instantaneous proportionality between the flux and the drive waveform during the course of each integration process.

Specific embodiments of the invention will now be described by way of example with reference to the accompanying diagrammatic drawings as applied to input pulses of short duration.

In the drawings:

FIG. 1 shows an idealized hysteresis loop of a magnetic element useful in the practice of the invention and a series of input pulses to be integrated;

FIG. 2 is a block diagram of one embodiment of the invention;

Figure 3:
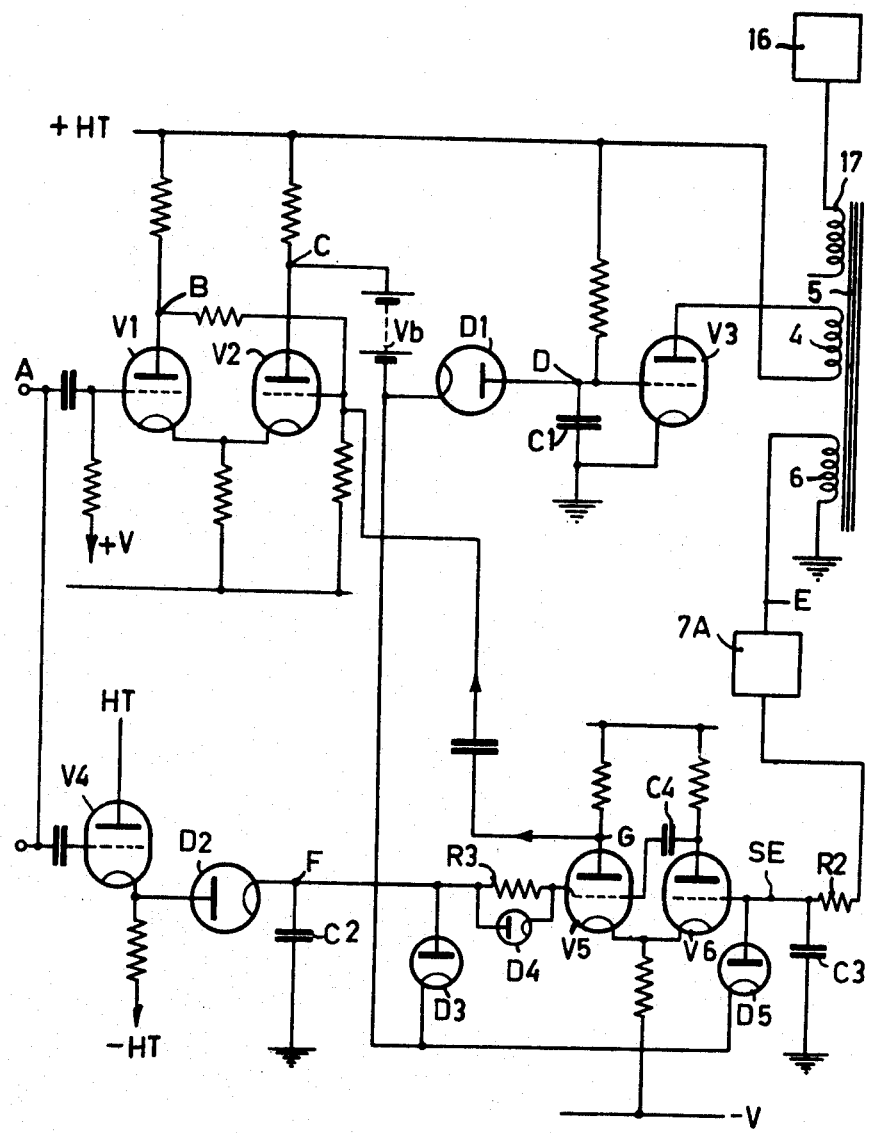
FIG. 3 is a schematic circuit diagram of the embodiment of FIG. 2.

Before describing the individual examples, their mode of operation may first be explained in a general manner. In all cases a drive wave of sawtooth waveform is applied to the excitation means, the latter comprising an amplifier and an energizing winding. A further general feature of the examples is the use of a pickup winding with the aid of which the flux changes are detected and measured as induced voltages.

Referring to FIGURE 1, which shows an idealized hysteresis loop, let it be assumed that a series of input pulses $p1-p3$ of differing amplitude are to be integrated. It will also be assumed that the core starts integrating from an initial remanence point or corresponding to saturation in one direction.

In operation, each input pulse causes the production of an energizing current for energizing the core, such current following a waveform which starts from zero and rises to a value related to the peak level of the input pulse. After the occurrence of a first pulse $p1$, the core will have established in it a flux increment which is substantially proportional to the peak of the incoming input pulse (point $b$) and, or removal of the drive to the amplifier, the flux level will fall, in the normal way, to a remanent flux value $r1$. If a second input pulse $p2$ occurs, current drive is re-initiated with a further waveform starting from zero and rising to a value determined by the sum of the peak levels of the first and second input pulses. The output of the amplifier thus causes the field level in the energizing coil to rise first from zero (remanent value $r1$ of the core) to a level $b$ equal to the peak level produced by the first input pulse. It is important that the core be brought to this level with a minimum value of flux change and to this end a core is preferably used having a B-H curve with substantially horizontal "saturation" portions). The effect of minimising this flux change is that the voltage generated during this initial change is minimised and therefore the drive wave effects the transition from the remanent flux level $r1$ to the preceding peak flux level $b$ with a minimum of delay. Subsequent to the coil being returned to the field level corresponding to the said preceding peak flux level $b$ of the core, the core is subjected (by further energization) to a flux increment $b-c$ proportional to the peak value of he second input pulse, after which the core settles at the new remanent point $r2$. In the same way, pulse $p3$ raises the core from $r2$, via $c$ and $d$, to a point $r3$. Succeeding pulses will produce further increments of flux in an additive manner in the core so that, after a given interval, the flux value reached in the core can be used as an analogue indication of the summation of the peak values of all the pulses received.

Referring now to FIGURE 2, the input pulses to be added in an analogue manner are supplied to a pulse input terminal 1. These pulses are supplied to a drive circuit 2 (which is a triggered sawtooth generator) via a trigger circuit 2A. On receipt of each input pulse, the circuit 2 initiates a sawtooth drive waveform, and said waveform is applied through an amplifier 3 to an exciting winding 4 wound on the magnetic storage core 5.

As the flux level rises in the core 5, a voltage is induced in a winding 6 which voltage is integrated by an integrator 7 so as to derive a further voltage representative of the flux increment. The output of integrator 7 is fed to a comparator 9 wherein it is compared with a voltage equal or proportional to the peak value of the input pulse. Since it is assumed that the pulse has a duration which is too short for this purpose, its peak level is stored for the necessary length of time by a pulse stretcher circuit 10.

The comparator thus acts as a voltage level coincidence detector, and when coincidence occurs, it is arranged to produce an inhibiting signal having two functions. First, it acts on trigger circuit 2A to inhibit further rise of the sawtooth waveform in circuit 2, so that said waveform only produces a flux increment which is proportional to the peak level of the input pulse (consequently, the drive to amplifier 3 and winding 4 also ceases to rise).

The second function of the inhibiting signal is to cause a reset circuit 14 to provide a resetting signal for the integrator 7. Since it is essential that the integrator should not be reset before the inhibit signal has had time to operate, the circuit 2A is inserted between circuits 9 and 14 to provide a delay. The pulse reset circuit 14 operates, as will be appreciated, after each pulse so as to enable the integrator to integrate the flux increment due to each input pulse by an independent operation. The stretcher circuit 10 is also reset by the output from circuit 2A.

After the desired number of input pulses have been thus added, it is necessary to reset the core 5 so that a fresh analogue summation may be carried out, and such resetting can be effected with the aid of a circuit 16 and auxiliary winding 17 which are adapted to magnetize the core to saturation in a direction opposite to that used during the analogue summation process.

Since the output of the integrator 7 is proportional to the flux change in the core 5 within any one increment, a direct comparison between output of the integrator and the peak level of the pulse can be used to ensure that the core is always excited to the correct flux level for each pulse in spite of non-linearities of the core and of the exciting means comprising the amplifier 3.

FIGURE 3 shows in greater detail a circuit based on the arrangement of FIGURE 2. In this example the trigger circuit 2A is a Schmitt circuit using two triodes V1–V2 which are conductive in the quiescent state. The sawtooth generator 2 comprises a capacitor C1 which is charged through a resistor R1 when the clamping action of a diode D1 (with D.C. source V$b$) is removed by the switching over of circuit V1–V2. The amplifier 3 employs a tube V3.

The stretcher circuit 10 employs a cathode follower V4 feeding a capacitor C2 which stores the peak pulse level as a charge.

The integrator 7 is fed via an amplifier 7A and comprises elements R2 and C3.

The comparator employs a long-tailed pair V5–V6 having an R-C coupling R3–C4 which gives it a monostable action. A "set" level is applied to the grid of V5 by the stretcher circuit.

An input pulse excites two distinct circuits. First, whatever its amplitude, it triggers circuit V1–V2 and thus initiates the operation of sawtooth waveform generator 2. Secondly, it also is fed to the pulse stretcher 10. The rising sawtooth waveform generator signal is fed to the tube amplifier V3 exciting the coil 4. This excitation causes a flux change in the coil. Any such flux change induces in the pickup coil 6 an output corresponding to $dB/dt$. This is fed, via amplifier 7A, to integrating circuit 7 from which a rising output is obtained corresponding to the total flux change. This output is compared with the peak value or "set" voltage obtained from the pulse stretcher. When equality is reached, an inhibiting signal from the comparator 9 (i.e. from the anode of V5) is fed to the grid of V2 whereby the rising sawtooth waveform generator is arrested and its output reduced to zero. This removes the excitation to the core but the remanence retains the degree of magnetization existing at that moment.

The integrator output is now reduced to zero and the pulse stretcher is returned to its original condition by a subsidiary signal derived from the sawtooth waveform generator. The inhibiting circuit which is excited by the comparator reverts to its original condition a little later as it is controlled by an included time constant.

Figure 3A:
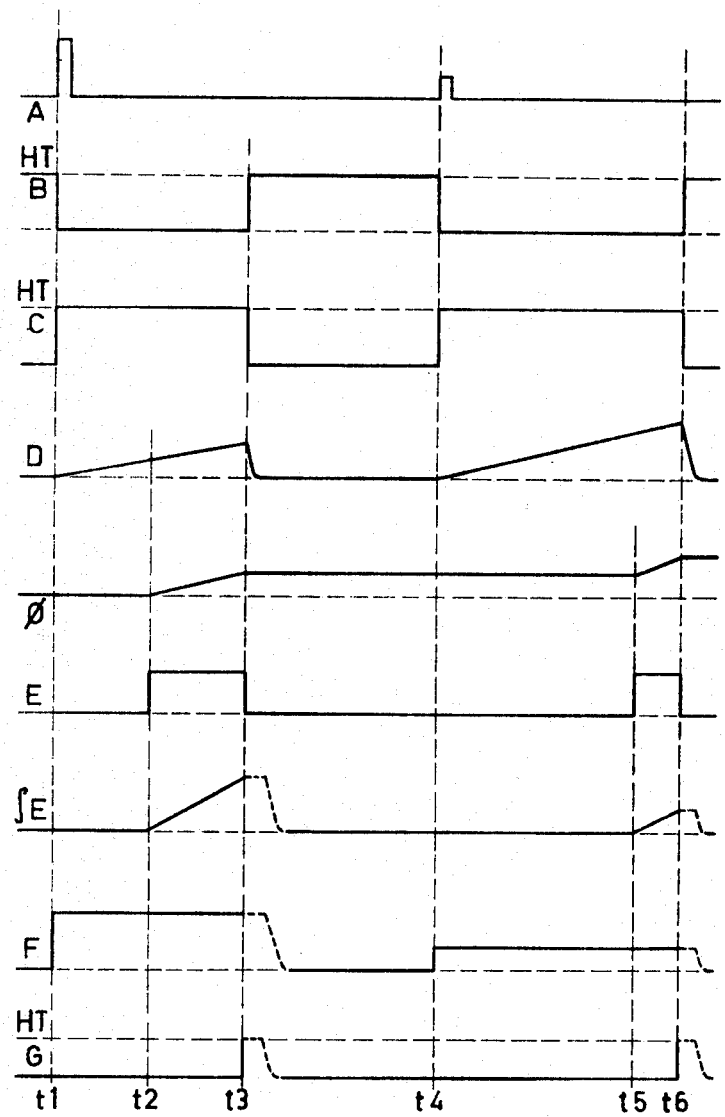
FIG. 3a is a series of waveforms appearing at corresponding points in the circuit of FIG. 3.

Waveforms appearing at points A to G of the circuit of FIG. 3 are shown schematically in FIGURE 3a.

From these it will be seen that, as an input pulse appears at A, point C rises due to V2 ceasing to conduct. This raises the cathodes of diodes D3 and D5. This permits point F to rise in accordance with the amplitude of the input pulse, and also permits the integrator to start operating.

It will also be seen that time delays t1–t2 and t4–t5 (see the curve representing the flux of the core) are due to the initial flux level in the core caused by the preceding pulses. The curves also show that the integrator output waveform ∫E corresponding to the actual flux increment during the particular excitation rises continually until the comparator circuit indicates equality with the output of the pulse stretcher (see curve F). When equality is reached, an output pulse appears at G and inhibits any further increase in the rising current sawtooth wave at D. The dotted portions of the last 3 graphs illustrate the action of the aforementioned time constant. Successive current sawtooth waves at D will have increasing peak amplitudes, the difference between any two successive sawtooth waves being related to the peak level of the pulse corresponding to the second of the two waves.

Figure 4:
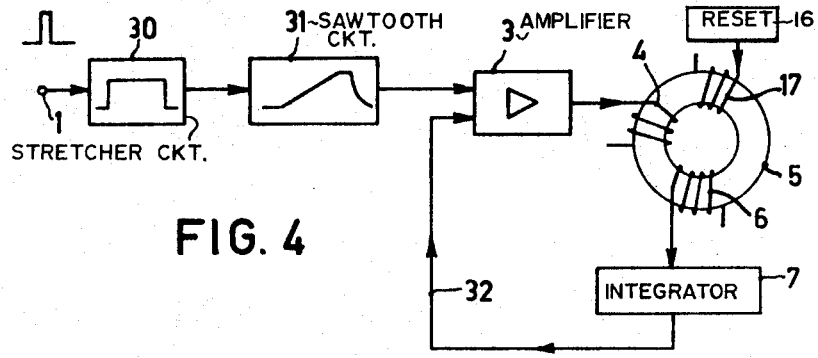
FIG. 4 is a block diagram of a second embodiment of the invention.

The circuit arrangement of FIGURE 4 employs an alternative method which does not require any comparison. This figure shows schematically apparatus wherein the drive circuit employs a sawtooth circuit for generating a progressively rising drive wave of predetermined waveform in response to the occurrence of each input pulse which wave has a peak amplitude equal or proportional to the peak level of the pulse, and wherein the control means comprise a feedback circuit for applying the output of the integrating means as degenerative feedback to an amplifier forming part of the excitation means. In this case non-linearities of the core and excitation means are compensated for by using the output of the integrator as a negative feedback applied to the input of the amplifier 3. Thus, the flux in the core substantially follows the drive waveform applied to the amplifier.

Such an arrangement suffers from certain limitations which arise from the fact that the integrating network necessitates a certain time in which to ensure complete integration before the feedback signal is fully established; for example, if the input pulse is very short, then the amplifier will be excited by it before the integrated feedback signal appears, and the amplifier and/or the magnetic core may be driven to saturation so that the core cannot be used as a storage medium. One method of avoiding this limitation is to arrange that the peak value of the input pulse is sustained by storage for sufficient period; thus, for example, a diode-capacitor network may be used to effect such storage at a level equal to the peak value of the input pulse. However, even with such storage, if the input pulse is such as to cause a sudden rise at the input of the amplifier, the incoming signal can over-drive the amplifier owing to the initial absence of any counterbalancing feedback signal so that, once again, saturation of the core can occur. This problem can be met, as aforesaid, by ensuring that the drive signal to the amplifier shall only rise at a rate which is sufficiently slow to promote correct establishment of a feedback signal. Thus the amplifier could be driven directly by the input pulses if the latter were to have a waveform having sufficiently slow rate of growth and sufficient duration. However, assuming that the input pulses do not conform to these two requirements, they may be converted to appropriate sawtooth waves having the same or proportional heights.

In FIGURE 4 such a circuit is shown in block schematic form, and comprises exciting means employing an amplifier 3 and a winding 4, and an integrator 7 connected to a winding 6.

The negative feedback loop is shown at 32, and the pulse input terminal is indicated at 1.

The input pulses are stretched in a stretcher circuit 30, the stretched pulse is subsequently converted into a sawtooth waveform in a unit 31, such waveform having a sufficiently long rise time and a peak equal or proportional to the peak level of the input pulse.

Figure 5:
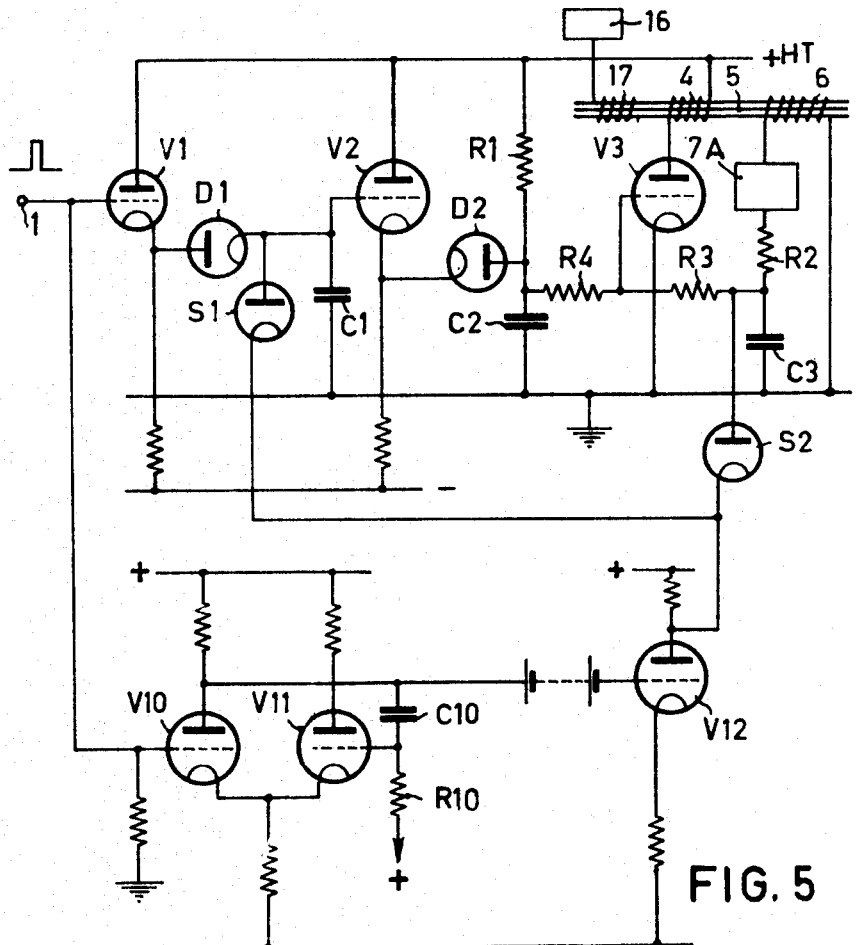
FIG. 5 is a schematic circuit diagram based on the embodiment of FIG. 4.

A more detailed circuit based on the arrangement of FIGURE 4 is shown in FIGURE 5. In this arrangement, the input pulses applied to terminal 1 are passed through a cathode follower stage employing a tube V1. The output of V1 is applied to a stretcher circuit comprising a diode D1 and a capacitor C1, these two units constituting together a storage circuit. Since the charge would persist for an excessively long time in the capacitor C1, a resetting diode switch is indicated at S1 which switch is closed automatically to discharge the storage or stretcher circuit after each pulse. (As an alternative to this circuit, it will be appreciated that a monostable stretcher circuit could be used in which case resetting means would not be required.)

The output of the stretcher circuit is applied through a cathode follower stage V2 to a circuit R1, D2, C2 which is provided to convert the stretched pulse into a sawtooth wave of appropriate amplitude. The resistance R1 and capacitor C2 provide a rising voltage across the capacitor as the latter is charged from the +HT line. However, this rise is limited by the action of the diode D2 which prevents the voltage across C2 rising above a level equal to the amplified peak level of the particular input pulse. After each sawtooth wave has been formed in this manner, the capacitor C2 has to be discharged after the completion of all the core storage operations relating to the particular input pulse, and this is effected as an additional function of diode S1 as will be explained.

The core 5 has wound on it windings 4 and 6 as in the previous examples and the excitation amplifier employs a tube V3. The integrator comprises a resistance R2 and a capacitor C3 and is fed via an amplifier 7A. A further resetting diode switch S2 is shown for discharging automatically capacitor C3 after each integration. The integrated voltage appearing across capacitor C3 is used as negative feedback for the amplifier tube V3 and to this end said voltage is applied to the grid of the tube via a resistance R3, such voltage being applied in opposition to the sawtooth drive wave which is applied to said grid via resistance R4.

The automatic discharge of capacitor C2 after each operation is obtained as follows without the need for a separate switch. When switch S1 discharges capacitor C1 as aforesaid, the grid of V2 is driven in the negative direction. Since V2 is a cathode follower, the free side of capacitor C2 will have drive applied in the negative direction via catching diode D2.

The switching diodes S1–S2 are controlled by a cathode-coupled switching circuit V10–V11 in the following manner. Input pulses of differing amplitude all trigger this circuit by switching on V10 and cutting off V11 for a period determined by R10–C10. This period is selected to be long enough for the maximum pulse likely to be encountered and therefore the operation cannot be as fast as a comparable circuit based on FIGURE 3. The connection from V10 anode is made via a bias battery (e.g. 300 v.) to the grid of V12, which is normally conducting. The anode of V12 is connected to the switching diodes S1–S2 which are therefore normally conducting and thus fulfill the following functions:

(i) holding the grid of V2 at substantially the same potential as the cathode of V1 so as to ensure that the quiescent starting potential of the stretcher capacitor C1 is always the same, and (ii) holding the free side of integrating capacitor C3 at an initially defined potential which, for convenience, may be the potential of the grid of V2 as in the example shown.

Any input pulse switches V10 and V11, and releases the anodes of diodes S1–S2 so that integration can proceed.

As in previous examples, a third winding 17 may be provided on the core 5 with means 16 for resetting the core after a completed summation.

In the circuit of FIGURE 5 the voltage of the +HT lines may, for example, be 300 v. and the —HT lines may be 300 v. below earth. As for the positive bias for V11, this may, for example, be 10 v.

In all examples the core may be of the ferrite material available under the trade-mark "Ferroxcube" as Type 6.

In summary, the arrangements of FIGURES 2 and 3 employ comparison between the final level of each flux increment in the core and the peak level of the input pulse. By contrast, the circuits of FIGURES 4 and 5 dispense with such final comparison but introduce the feature of continuous feedback between the integrator and the excitation means during each integration.

While the invention has been shown and described with reference to preferred embodiments, it is understood that various changes in form and structure may be made by those skilled in the art without departing from the inventive concept, the scope of which is set forth in the appended claims.

What is claimed is:

1. Apparatus for the analogue summation of the peak values of successive input pulses which apparatus comprises a remanent magnetic storage element, excitation means for changing the magnetization of said element, a circuit for driving said excitation means in response to the occurrence of discrete input pulses at discrete intervals of time, means for detecting any change in flux produced by said excitation means by converting the rate of such change into an electrical quantity, integrating means for integrating said electrical quantity so as to obtain an integrated electrical quantity representative of said change in flux, and control means responsive to said integrated quantity for controlling the excitation in such manner as to cause each flux change to assume a value representative of the peak level of the respective input pulse.

2. Apparatus according to claim 1 wherein the drive circuit comprises a triggered sawtooth circuit for generating a progressively rising drive wave of predetermined waveform when triggered by the occurrence of an input pulse, and wherein the control means comprises a comparator for comparing the output of the integrating means with a level equal or proportional to the peak level of the input pulse and producing a signal for inhibiting further rise of the drive and excitation waveforms in response to the occurrence of equality between the levels compared.

3. Apparatus according to claim 1 wherein the drive circuit employs a sawtooth circuit for generating a progressively rising drive wave of predetermined waveform in response to the occurrence of each input pulse which wave has a peak amplitude equal or proportional to the peak level of the pulse, and wherein the control means comprises a feedback circuit for applying the output of the integrating means as degenerative feedback to an amplifier forming part of the excitation means.

4. Integrating apparatus for adding the peak values of successively applied input pulses comprising: a remanent magnetic storage element, excitation means for changing the remanent condition of said element, a drive circuit for driving said excitation means, means for applying said successive input pulses to said drive circuit, means coupled to said magnetic storage element for deriving therefrom a signal proportional to the rate of change of flux in said element, integrating means for integrating said signal, and control means responsive to the integrated signal, said control means being coupled to said excitation means and causing each flux change due to a particular input pulse to assume a value representative of the peak level of said particular input pulse.

5. Integrating apparatus for adding the peak values of successively applied input pulses comprising: a remanent magnetic storage element, excitation means for changing the remanent condition of said element, a drive circuit for driving said excitation means, means for applying said successive input pulses to said drive circuit, said drive circuit comprising a triggered sawtooth circuit for generating a progressively rising drive wave of predetermined waveform when triggered by the occurrence of an input pulse, means coupled to said magnetic storage element for deriving therefrom a signal proportional to the rate of change of flux in said element, integrating means for integrating said signal, and control means responsive to the integrated signal, said control means being coupled to said excitation means and causing each flux change due to a particular input pulse to assume a value representative of the peak level of said particular input pulse.

6. Integrating apparatus for adding the peak values of successively applied input pulses comprising: a remanent magnetic storage element having two opposite saturation states, excitation means for changing the remanent condition of said element, a drive circuit for driving said excitation means, means for applying said successive input pulses to said drive circuit, each input pulse having a peak value less than that required to change said magnetic storage element from one saturation state to the other, means coupled to said magnetic storage element for deriving therefrom a signal proportional to the rate of change of flux in said element, integrating means for integrating said signal, control means responsive to the integrated signal, said control means being coupled to said excitation means and causing each flux change due to a particular input pulse to assume a value representative of the peak level of said particular input pulse, and reset means coupled to said magnetic storage element to change said element from one saturation state to the other.

7. Integrating apparatus for adding the peak values of successively applied input pulses comprising: a remanent magnetic storage element, excitation means for changing the remanent condition of said element, a drive circuit for driving said excitation means, means for applying said successive input pulses to said drive circuit, said drive circuit comprising a triggered sawtooth circuit for generating a progressively rising drive wave of predetermined waveform when triggered by the occurrence of an input pulse, means coupled to said magnetic storage element for deriving therefrom a signal proportional to the rate of change of flux in said element, integrating means for integrating said signal, and a comparator responsive to the integrated signal and the peak level of each input pulse, said comparator being operative to compare said integrated signal with a level equal or proportional to the peak level of each input pulse, the output of said comparator being coupled to said drive circuit and producing a control signal which inhibits further rise of said drive waveform in response to the occurrence of equality between the levels compared, thereby causing each flux change due to a particular input pulse to assume a value represenative of the peak level of said particular input pulse.

8. Integrating apparatus for adding the peak values of successively applied input pulses comprising: a remanent magnetic storage element, excitation means for changing the remanent condition of said element, a drive circuit for driving said excitation means, means for applying said successive input pulses to said drive circuit, said drive circuit comprising a triggered sawtooth for generating a progressively rising drive wave of predetermined waveform when triggered by the occurrence of an input pulse, means coupled to said magnetic storage element for deriving therefrom a signal proportional to the rate of change of flux in said element, integrating means for integrating said signal, said integrating means having an initial condition, and a comparator having one input coupled to said integrator and another input coupled to an input pulse and responsive to the integrated signal and the peak level of each input pulse, said comparator being operative to compare said integrated signal with a level equal or proportional to the peak level of each input pulse, the output of said comparator being coupled to said drive circuit and a reset means for said integrator, said comparator producing a control signal in response to the occurrence of equality between the levels compared, said control signal inhibiting further rise of said drive waveform and resetting said integrating means to said initial condition, whereby each flux change due to a particular input pulse is caused to assume a value representative of the peak level of said particular input pulse.

9. Integrating apparatus as recited in claim 8, wherein the output of said comparator is coupled to said reset means through a circuit providing a time delay.

10. Integrating apparatus as recited in claim 8, wherein said input pulses are applied to said drive circuit through a trigger circuit, and the output of said comparator is coupled to said reset means through said trigger circuit.

11. Integrating apparatus for adding the peak values of successively applied input pulses comprising: a remanent magnetic storage element, excitation means including an amplifier for changing the remanent condition of said element, a drive circuit for driving said excitation means, means for applying said successive input pulses to said drive circuit, said drive circuit comprising a sawtooth circuit for generating a progressively rising drive wave of predetermined waveform in response to the occurrence of each input pulse, said wave having a peak amplitude equal or proportional to the peak level of the pulse, means coupled to said magnetic storage element for deriving therefrom a signal proportional to the rate of change of flux in said element, integrating means for integrating said signal, and a feedback circuit coupling the integrated signal as degenerative feedback to said amplifier, each flux change due to a particular input pulse assuming a value representative of the peak level of said particular input pulse.

References Cited by the Examiner

UNITED STATES PATENTS 2,951,949    9/1960    Kuntzleman _____ 307—88

FOREIGN PATENTS 858,208    1/1961    Great Britain.

IRVING L. SRAGOW, *Primary Examiner*.